(12) United States Patent
Duan et al.

(10) Patent No.: US 8,319,417 B2
(45) Date of Patent: Nov. 27, 2012

(54) ABOS:M-BASED PHOSPHORS AND LIGHT SOURCES CONTAINING THESE PHOSPHORS

(75) Inventors: Cheng-Jun Duan, Bad Satzungen (DE); Theresia Hubertus Hintzen, Eindhoven (NL); Sylke Rösler, Eisenach (DE); Detlef Starick, Greifswald (DE)

(73) Assignee: Leuchtstoffwerk Breitungen GmbH, Breitungen (DE)

( * ) Notice: Subject to any disclaimer, the term of this patent is extended or adjusted under 35 U.S.C. 154(b) by 151 days.

(21) Appl. No.: 12/920,988

(22) PCT Filed: Mar. 5, 2009

(86) PCT No.: PCT/EP2009/001546
§ 371 (c)(1),
(2), (4) Date: Nov. 4, 2010

(87) PCT Pub. No.: WO2009/109382
PCT Pub. Date: Sep. 11, 2009

(65) Prior Publication Data
US 2011/0043099 A1 Feb. 24, 2011

(30) Foreign Application Priority Data
Mar. 6, 2008 (EP) ..................... 08152342

(51) Int. Cl.
*H01J 1/63* (2006.01)
*C09K 11/78* (2006.01)
(52) U.S. Cl. ... 313/498; 313/483; 313/512; 252/301.4 F
(58) Field of Classification Search .................. 313/483, 313/498–512; 252/301.4 F; 428/690; 427/66, 427/532–535, 539; 438/26–29
See application file for complete search history.

(56) References Cited

FOREIGN PATENT DOCUMENTS
CN 101081979 12/2007

OTHER PUBLICATIONS

S. Broadley, et al., "Vertex-Linked ZnO2S2 Tetrahedra in the Oxysulfide BaZnOS: a New Coordination Environment for Zinc in a Condensed Solid", Inorg. Chem. 44 (2005) 9092-9096.
V.I. Yarygin, et al., "Izvestija Akademii Nauk SSSR", Metally 2 (1977) 104-7.

(Continued)

*Primary Examiner* — Joseph L Williams
(74) *Attorney, Agent, or Firm* — Mark D. Wieczorek; Mayer & Williams PC

(57) ABSTRACT

This invention is related to efficient anorganic phosphors, which are based on an oxysulfide host lattice of the general formula ABOS:M. Furthermore, this invention is related to the use of these phosphors in various technical applications such as fluorescent lamps, colored light or white light emitting LEDs, scanning beam displays working with UV or purple laser as exciting source and other devices in order to convert especially UV or NUV radiation or short-wave visible light into an useful longer-wave visible radiation. This invention is also related to light sources and/or display applications that contain the inventive phosphor. An inventive phosphor shows the general formula ABOS:M, where A is at least one element selected from the group consisting of Ca, Mg, Sr, and Ba; B is at least one element selected from the group consisting of Zn and Mg; M is at least one first element selected from the group consisting of $Mn^{2+}$, $Cu^{2+}$, and $Eu^{2+}$, $Pb^{2+}$, $Sb^{3+}$, $Sn^{2+}$, $Bi^{3+}$, $Ce^{3+}$, $Tb^{3+}$, and $Pr^{3+}$; and additionally at least one second element selected from the group consisting of $Mn^{2+}$, $Cu^{2+}$, $Cu^+$, $Ag^+$, $Pb^{2+}$, $Sb^{3+}$, $Sn^{2+}$, $Bi^{3+}$, $Eu^{2+}$, $Ce^{3+}$, $Tb^{3+}$, $Pr^{3+}$ and $La^{3+}$ as well as $Li^+$, $Na^+$, $K^+$, and $Rb^+$, wherein at least one of the second elements is different from every one of the first elements.

20 Claims, 2 Drawing Sheets

OTHER PUBLICATIONS

Figure 1:
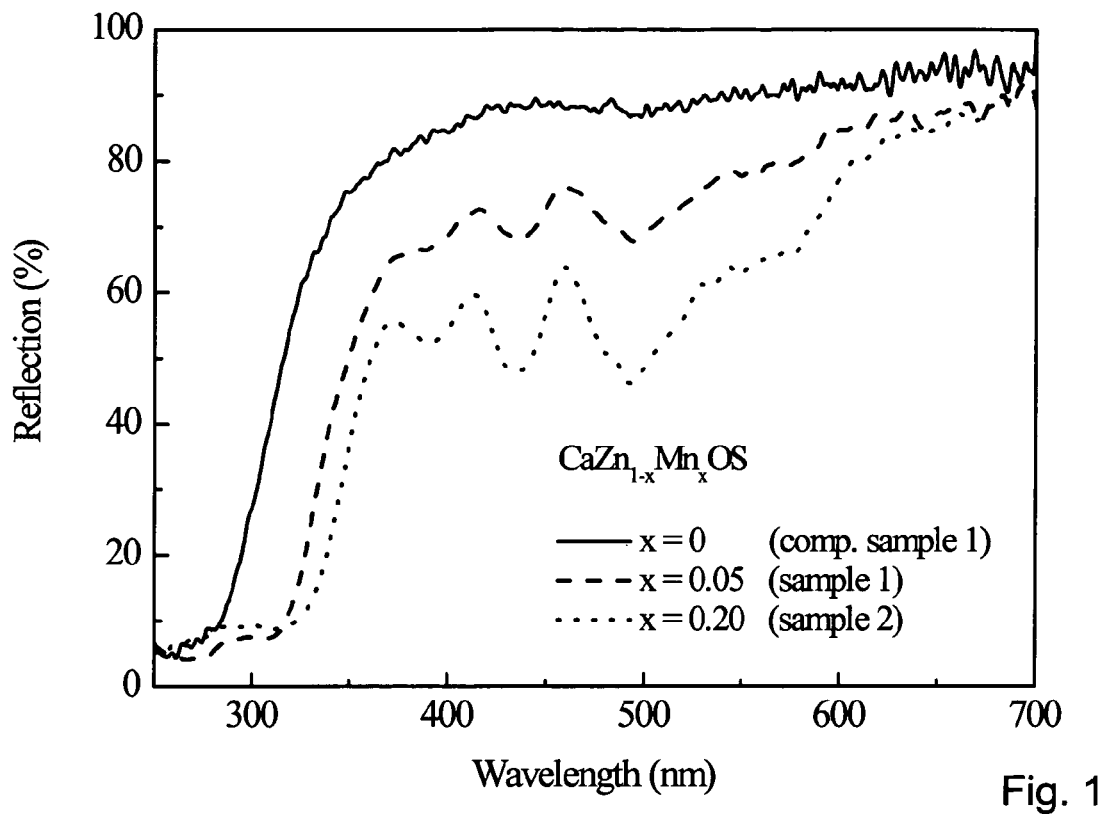

Shu Fen Wang et al., "Effect of Pb2+ on the photoluminescence characteristics of ZrO2:Mn2+ nanocrystals" Inorganic Chemistry Communications, vol. 6, 2003, pp. 1275-1277.

S.F. Wang et al., "Effect of Pb2+ ions on the photoluminescence characteristics of Mn2+-doped Zn2S1O4" Applied Physics A—Materials Science & Processing, vol. 80, 2005, pp. 871-874.

R. Cywinski et al., "Energy Transfer in Thermally Annealed KCL:PB2+, Mn2+ System" Phys. Stat. Sol. B, vol. 171, 1992, pp. 517-521.

Chonghui Shen, et al. "Energy Transfer Phenomena in GdMgB5O10:Pb2+, Mn2+/Tb3+" Journal of Luminescence, vol. 40-41, 1988, pp. 663-664.

C.J. Duan et al. "Photoluminescence Properties of Novel Red-emitting Mn2+-Activated MZnOS (M+Ca, Ba) phosphors" Chemistry of Mateirals, vol. 21, Feb. 20, 2009, pp. 1010-1016.

Yujuan Xia et al. "A Novel red-emitting Mn-activated BaZnOS phosphor" Optical Materials, vol. 31, Jun. 20, 2008, pp. 311-314.

Han Xiumei et al., "Photoluminescent properites of Ca2RE8(si04)602:A (RE=Y, Gd; A-Pb2+, Mn2+) phosphor films prepared by sol-gel process" Journal of Rare Earths, vol. 26, Jun. 2008, pp. 443-445.

Yujuan Xia et al. "Luminescence properties of Cu-activated BaZnOS phosphor" Solid State Science, vol. 9, 2007, pp. 1074-1078.

Sambrook et al., "Structure and Physical Properties of the Polar Oxysulfide CaZnOS", Inorganic Chemistry, vol. 46, No. 7, 2007, 2571-2574.

S. A. Petrova, et al. "Crystal Structure of Zinc Calcium Oxysulfide", Inorg. Chern. 46 (2Q07) 2571-2574.

S. Broadley, et al. "Vertex-Linked ZnO2S2 Tetrahedra in the Oxysulfide BaZnOS: a New Coordination Environment for Zinc in a Condensed Solid", Inorg. Chern. 44 (2005) 9092-9096.

ABOS:M-BASED PHOSPHORS AND LIGHT SOURCES CONTAINING THESE PHOSPHORS

FIELD OF THE INVENTION

This invention is related to efficient anorganic phosphors, which are based on an oxysulfide host lattice of the general formula ABOS:M. Furthermore, this invention is related to the use of these phosphors in various technical applications such as fluorescent lamps, colored light or white-light-emitting LEDs, scanning beam displays working with UV or purple lasers as exciting sources and other devices in order to convert especially UV or NUV radiation or short-wave visible light into useful longer-wave visible radiation. This invention is also related to light sources and/or display applications that contain the inventive phosphor.

BACKGROUND

CaZnOS was described as the first alkaline earth zinc oxysulfide compound in 1977 by V. I. Yarygin, M. M. Shokarev, V. E. Mamaev, I. M. Kolganov, N. I. Kopylov: Izvestija Akademii Nauk SSSR, Metally 2 (1977) 104-7.

Furthermore, the preparation, structure and physical properties of CaZnOS were presented in several publications, e.g., in S. A. Petrova, V. P. Marevich, R. G. Zakharov, E. N. Selivanov, V. M. Chumarev, L. Yu. Udoeva: *Doklady Chemistry*, 393 (2003) p. 255-258 and T. Sambrook, C. F. Smura, S. J. Clarke, K. M. Ok, P. Shiv Halasyamani: *Inorg. Chem.* 46 (2007) p. 2571-2574. Additionally, the preparation and structure of BaZnOS were published by S. Broadley, Z. A. Gál, F. Corá, C. F. Smura, S. J. Clarke in *Inorg. Chem.* 44 (2005) p. 9092-9096. It has been shown that CaZnOS and BaZnOS crystallize in different structures whereas CaZnOS has a hexagonal symmetry with a space group of P6₃mc and BaZnOS an orthorhombic one with a space group of Cmcm.

A first BaZnOS-based phosphor activated by Cu was presented in Xia, Y., et al.: "Luminescence properties of Cu-activated BaZnOS phosphor" in *Solid State Science*, 2007, 9, 1074. Additionally, BaZnOS-based phosphors that are activated by Mn and Cu are disclosed in CN 101081979 A.

SUMMARY OF THE INVENTION

It is an object of the present invention to provide novel band-emitting phosphors that show improved efficiency properties when excited by radiation in the ultraviolet or blue range and regarding a small width at half maximum.

This invention discloses phosphors having the general formula ABOS:M, where A is at least one element selected from the group consisting of Ca, Mg, Sr, and Ba; B is at least one element selected from the group consisting of Zn and Mg; and M is at least one first element selected from the group consisting of $Mn^{2+}$, $Cu^{2+}$, and $Eu^{2+}$, $Pb^{2+}$, $Sb^{3+}$, $Sn^{2+}$, $Bi^{3+}$, $Ce^{3+}$, $Tb^{3+}$, and $Pr^{3+}$. M additionally contains one or more second elements selected from the group consisting of $Mn^{2+}$, $Cu^{2+}$, $Cu^+$, $Ag^+$, $Pb^{2+}$, $Sb^{3+}$, $Sn^{2+}$, $Bi^{3+}$, $Eu^{2+}$, $Ce^{3+}$, $Tb^{3+}$, $Pr^{3+}$ and $La^{3+}$ as well as $Li^+$, $Na^+$, and $Rb^+$. At least one of the second elements is different from every one of the first elements; i.e., M consists of at least two different elements. The single first element or the multiple first elements act as activators. The single second element or the multiple second elements act as coactivators or as sensitizers.

If trivalent activators $Sb^{3+}$, $Bi^{3+}$, $Ce^{3+}$, $Tb^{3+}$, and/or $Pr^{3+}$ are used, charge equalization is possible by addition of monovalent cations, such as alkali metal ions $Li^+$, $Na^+$, $Rb^+$.

If more than one activator is used one of the activators can serve as a coactivator or sensitizer.

The concentrations of these activators, co-activators and/or sensitizers are preferably adjusted in the range from zero up to 50 atomic percent.

The inventive phosphors show excitation bands in the range of 200 nm to 550 nm. They can also be excited by cathode (CR) radiation.

Preferably, the phosphors of this invention emit a longer-wave radiation in the visible range of 400 nm to 780 nm depending on activator ion and activator concentration.

In a preferred embodiment, one of the first elements of M is $Mn^{2+}$; i.e., the phosphor is activated by $Mn^{2+}$. The single second element or the multiple second elements of M are selected from the group consisting of $Cu^{2+}$, $Pb^{2+}$, $Sn^{2+}$, $Eu^{2+}$, $Bi^{3+}$, $Ce^{3+}$, $Tb^{3+}$, $La^{3+}$, and $Pr^{3+}$ as well as $Li^+$, $Na^+$, $K^+$, and $Rb^+$. These elements can serve as coactivators or sensitizers. If trivalent activators are used, charge equalization is possible by monovalent cations, such as $Li^+$, $Na^+$, $K^+$, $Rb^+$. The inventive $Mn^{2+}$-activated ABOS phosphors show an efficient narrowband orange to red emission. Due to the sensitizer or coactivator ions, further weaker emission bands or lines can also occur. The $Mn^{2+}$-activated ABOS phosphors can be excited by UV radiation or short-wave visible light. The advantage of these phosphors is that their excitability can be modified by the choice of the sensitizer and/or coactivator ions so that the application fields of phosphor can be expanded. The function of sensitizer ions consists in (1) the effective absorption of such an excitation radiation which can not be applied for $Mn^{2+}$ ions as a luminescence center alone and in (2) an efficient energy transfer of the absorbed energy to the $Mn^{2+}$ ions leading to an intensive $Mn^{2+}$ emission. Therefore, the field of application can be expanded, especially for applications where an NUV or longer-wave radiation is used as excitation source such as white-light emitting LEDs.

In preferred embodiments of the inventive phosphor, $Mn^{2+}$ is the only first element of M and the phosphor shows one of the following general formulas:

CaZnOS:M;

CaZnOS:M, wherein the second element of M is $Pb^{2+}$;

BaZnOS:M;

BaZnOS:M, wherein the second elements of M are $La^{3+}$ and $Li^+$;

BaZnOS:M, wherein the second elements of M are $Bi^{3+}$ and $Li^+$;

BaZnOS:M, wherein the second element of M is $Pb^{2+}$.

In a special embodiment, the inventive phosphor is based on BaZnOS, whereas Ba can be partially replaced by Mg, Ca and/or Sr, and whereas Zn can be partially replaced by Mg. The phosphor is activated by $Mn^{2+}$ and one or more elements selected from the main group elements $Pb^{2+}$, $Sn^{2+}$, $Bi^{3+}$, $Sb^{3+}$, $Li^+$, $Na^+$, $K^+$ and $Rb^+$; from the rare earth elements such as $Eu^{2+}$, $Ce^{3+}$, $Tb^{3+}$, $Pr^{3+}$, and $La^{3+}$; and from the group of transition metals $Ag^+$, $Cu^+$ and $Cu^{2+}$. The other activators, besides $Mn^{2+}$, serve as coactivators or sensitizers. If trivalent activators are used, charge equalization is possible by monovalent cations, such as alkali metal ions $Li^+$, $Na^+$, $K^+$, $Rb^+$. $Mn^{2+}$-activated BaZnOS phosphors show a red emission band in the wavelength range between 550 nm and 780 nm peaking at 620 nm to 650 nm. Due to sensitizer or coactivator ions, further weaker emission bands or lines can also occur. The maximum of excitation of the inventive sensitized $Mn^{2+}$-activated BaZnOS is red-shifted compared to that of non-sensitized BaZnOS. Therefore, it is possible to use UV radiation of 350 nm or longer wavelengths to excite the phosphor. As a consequence, the inventive phosphor can be applied e.g., in light applications such as high-pressure mercury discharge lamps or white-light emitting LEDs.

In a further special embodiment, the inventive phosphor is based on CaZnOS, whereas Ca can be partially replaced by Mg, Sr, and/or Ba, and whereas Zn can be partially replaced by Mg.

In contrast to the alkaline earth oxysulfides like $Sr_2OS$ or $Ca_2OS$ and alkaline earth metal sulfides, CaZnOS is chemically stable in moist air. This phosphor can be activated by one or more first elements of M selected from the group of transition metals $Mn^{2+}$, $Cu^{2+}$, $Cu^+$, and $Ag^+$ main group elements $Pb^{2+}$, $Sb^{3+}$, $Sn^{2+}$, $Bi^{3+}$, $Li^+$, $Na^+$, $K^+$, and $Rb^+$; and rare earth elements $Eu^{2+}$, $Ce^{3+}$, $Tb^{3+}$, $Pr^{3+}$, and $La^{3+}$. If more than one activator is used, one of the activators can serve as coactivator or sensitizer. If trivalent activators are used, charge equalization is possible by monovalent cations, such as alkali metal ions $Li^+$, $Na^+$, $K^+$, $Rb^+$. The inventive phosphors according to this embodiment can be excited by UV radiation or short-wave visible light and show longer-wave emission bands in the visible range of 400 nm to 780 nm depending on activator ion and activator concentration, e.g., $Pb^{2+}$ or $Bi^{3+}$-activated CaZnOS phosphors show a blue emission band in the wavelength range 350 nm to 550 nm with peak centers at 405 nm to 425 nm and 460 nm to 480 nm, respectively, when excited by UV radiation.

Due to its non-centrosymmetric structure, CaZnOS is especially suitable for an Mn-based luminescence. $Mn^{2+}$-activated CaZnOS phosphors can not only be excited by UV-B radiation, but also have strong excitation bands in the wavelength range 380 nm to 550 nm. These phosphors show an orange-red emission band in the wavelength range 550 nm to 780 nm peaking at 610 nm to 620 nm.

Preferably, the $Mn^{2+}$-activated CaZnOS phosphors are coactivated and/or sensitized by $Cu^{2+}$, $Cu^+$, $Ag^+$, $Pb^{2+}$, $Sn^{2+}$, $Bi^{3+}$, $Ce^{3+}$, $Tb^{3+}$, $La^{3+}$ and $Pr^{3+}$. By that, the excitability of the phosphor can be modified and the efficiency can be increased. Due to the function of the sensitizer ion, it is possible to apply an excitation radiation which is not applicable for the $Mn^{2+}$ ion alone, but which can effectively be absorbed by the sensitizer ion. After an efficient transfer of the absorbed energy from the sensitizer ion to the $Mn^{2+}$ luminescent center, an intense $Mn^{2+}$ based emission is shown as it is observed for, e.g., CaZnOS:$Mn^{2+}$, $Pb^{2+}$, i.e., M consists of $Mn^{2+}$ and $Pb^{2+}$. The advantage of these combinations of activators consists in a considerable enhancement of the excitability of the inventive phosphors in the NUV range between 300 nm and 400 nm.

Due to the described luminescence characteristics, the phosphors according to the present invention can be used as a radiation converter for the transformation of cathode, UV, violet or blue radiation into a longer-wave visible light that will be emitted by the phosphor preferably in the blue to red spectral region.

As appropriate technical devices, cathode ray tubes (CRT), special laser-based large screen displays, fluorescent lamps, colored light or white emitting LED's, and also, for example, photovoltaic cells or greenhouse foils or glasses can be regarded.

As excitation sources for the inventive phosphors, electron generators, high or low-pressure discharge plasmas, UV or blue emitting organic or inorganic light emitting diodes (LED) or appropriate lasers or laser diodes, or, in addition, inorganic thin or thick electroluminescent screens are used.

The inventive phosphor can be used as single component in a relevant light emitting element or in combination with other red, yellow, green, and/or blue-emitting phosphors in order to improve the performance of the respective application. The latter meets, for example, the improvement of the color rendering indices (CRI) of fluorescent lamps and white emitting LED's.

An inventive light source comprises a first phosphor according to the invention and a second phosphor that emits red, yellow, green, and/or blue light.

The inventive phosphor can be prepared by careful mixing of alkaline earth metal oxide and ZnS as well as one or more activator or coactivator compounds and subsequent firing of the mix at 900-1200° C. (preferably 1000-1100° C.) in an inert atmosphere (nitrogen, noble gas) or in a reduced atmosphere ($H_2/N_2$) for 4-48 h.

Instead of alkaline earth metal oxide, another alkaline earth metal oxide precursor such as the corresponding acetate, carbonate, nitrate, oxalate, or sulfate can be used.

ZnS may be partially replaced by MgS.

MnO, manganese oxide precursors such as manganese(II) carbonate, manganese nitrate, manganese sulfate, as well as other manganese compounds such as MnS or further manganese(II) salts can be used as activator compounds.

The oxides of copper, silver, lead, tin, bismuth, cerium, europium, lanthanum, praseodym and terbium as well as their precursors such as the corresponding acetates, carbonates, nitrates, oxalates, or sulfates, or further salts of the above mentioned metals can be used as activator compounds.

The oxides of lithium, sodium, potassium or rubidium as well as their precursors such as the corresponding acetates, carbonates, nitrates, oxalates, or sulfates, or further salts of the above-mentioned metals can be used as coactivator compounds to keep the charge neutrality when trivalent activators are used.

Melting agents, such as alkali metal halide, alkaline earth metal halide and ammonium halide can be used in order to improve the crystal habit and in order to control the grain size.

In another embodiment, the phosphor is made from an alkaline earth metal sulfide and ZnO as well as one or more activator compounds according to the above procedure. ZnO can be partially replaced by MgO. A third method of preparing the inventive phosphor is based on the reaction of alkaline earth metal oxide or a corresponding precursor and ZnO as well as one of the above-mentioned activator compounds with sulfur, soda and an appropriate fluxing agent such as alkali phosphate at a temperature between 900° C. and 1200° C. in air. ZnO can be partially replaced by MgO.

The grain size of the inventive phosphor may vary in a large range. An average grain size of the phosphor can be a few nanometers. However, the grain size can be adjusted to particle sizes up to 30 μm.

In the context of this invention, a further phosphor was found that is currently not claimed in this patent application. This phosphor shows the general formula ABOS:M, where A is at least one element selected from the group consisting of Ca, Mg, Sr, and Ba; B is at least one element selected from the group consisting of Zn and Mg; and M is at least one first element selected from the group consisting of $Mn^{2+}$, $Cu^{2+}$, and $Eu^{2+}$, $Pb^{2+}$, $Sb^{3+}$, $Sn^{2+}$, $Bi^{3+}$, $Ce^{3+}$, $Tb^{3+}$ and $Pr^{3+}$; and additionally none or at least one second element selected from the group consisting of $Mn^{2+}$, $Cu^{2+}$, $Cu^+$, $Ag^+$, $Pb^{2+}$, $Sb^{3+}$, $Sn^{2+}$, $Bi^{3+}$, $Eu^{2+}$, $Ce^{3+}$, $Tb^{3+}$, $Pr^{3+}$ and $La^{3+}$ as well as $Li^+$, $Na^+$, $K^+$, and $Rb^+$. In one of the preferred embodiments, M contains none of the second elements. In another preferred embodiment, the phosphor shows the general formula CaZnOS:M, whereas Ca can be partially replaced by Mg, Sr, and/or Ba; whereas Zn can be partially replaced by Mg; and whereas M contains none of the second elements. In a further preferred embodiment, the phosphor shows the general formula CaZnOS:$Mn^{2+}$, whereas Ca can be partially replaced by Mg, Sr, and/or Ba; whereas Zn can be partially replaced by Mg. Moreover, this phosphor can be implemented analogously to the abovementioned embodiments of the inventive phosphor.

DETAILED DESCRIPTION

Figure 2:
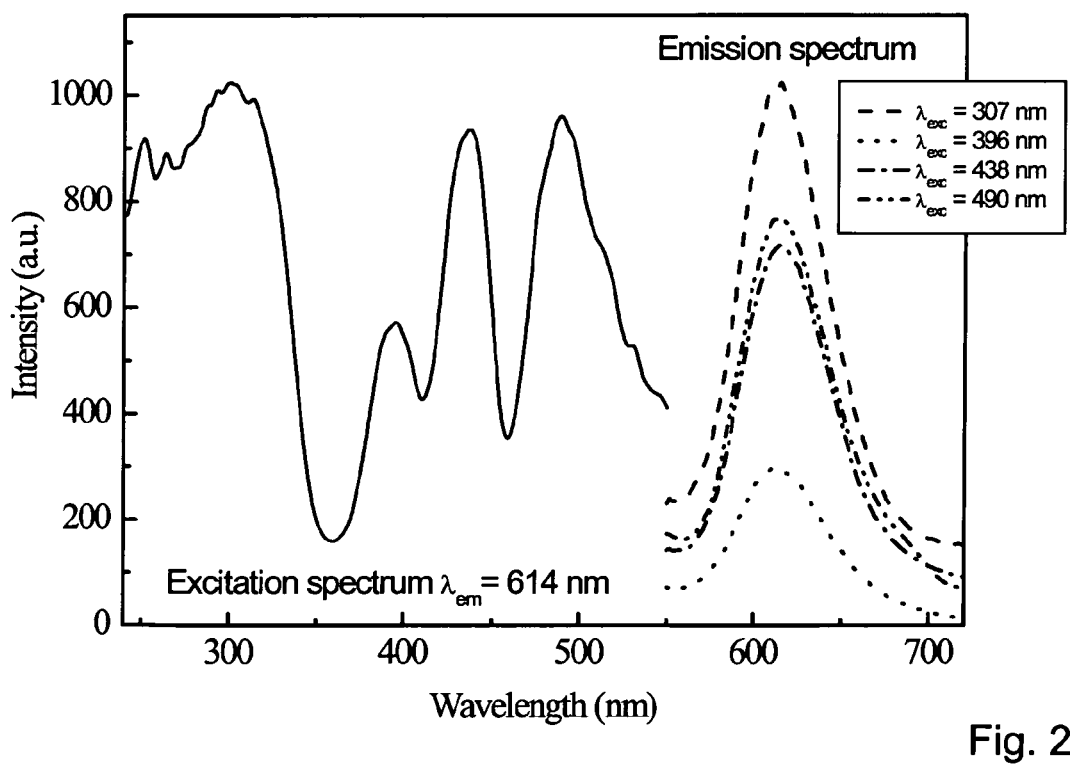
Figure 3:
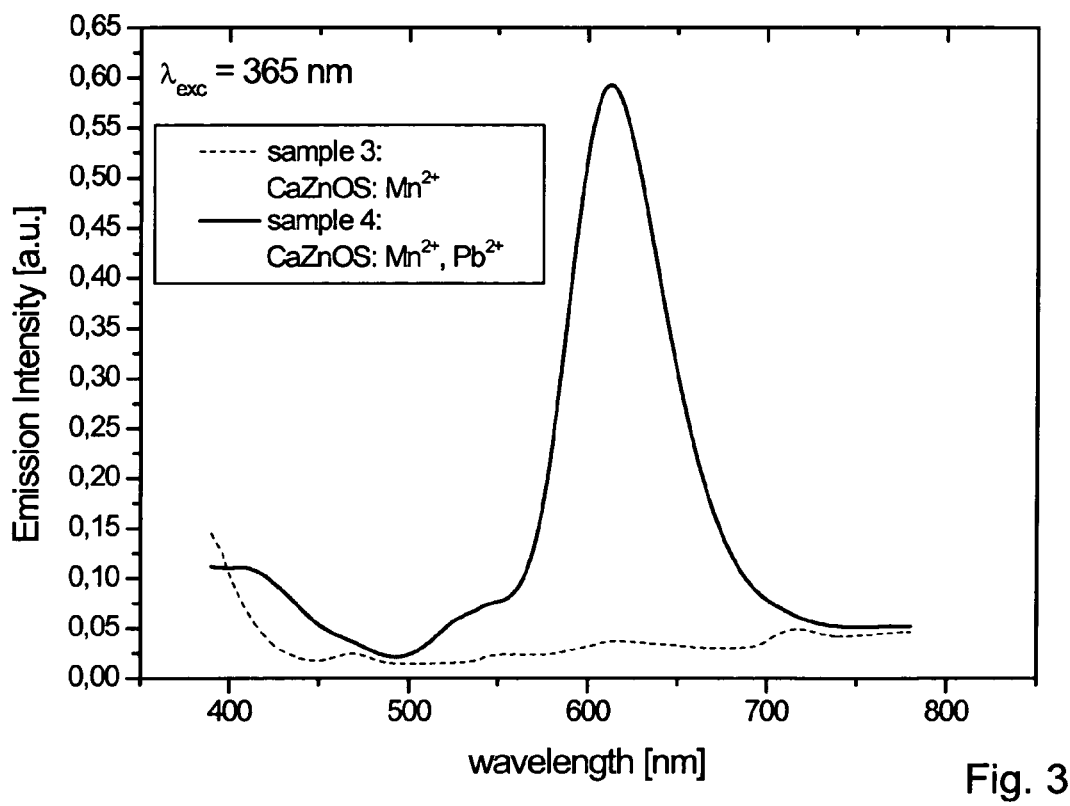

The foregoing features and advantages of the present invention will become better understood and more readily appreciated by reference to the following detailed description of the preferred embodiments of invention taken in conjunction with the accompanying drawings, wherein:

FIG. 1: Diffuse reflection spectra of CaZnOS (comparative sample 1) and CaZnOS:$Mn^{2+}$ sample 1 and 2, respectively;

FIG. 2: Excitation and Emission spectra of CaZnOS:$Mn^{2+}$ sample 1;

FIG. 3: Emission spectra of CaZnOS:$Mn^{2+}$ (sample 3) and CaZnOS:$Mn^{2+}$, $Pb^{2+}$ (sample 4) under 365 nm excitation; and FIG. 4: Emission spectra of BaZnOS:$Mn^{2+}$ comparative example 2, BaZnOS:$Mn^{2+}$, $Bi^{3+}$, $Li^+$ (sample 5) and BaZnOS:$Mn^{2+}$, $La^{3+}$, $Li^+$ (sample 6) under 365 nm excitation.

In the following, preparation and photoluminescence properties of some preferred examples of inventive $Mn^{2+}$-activated CaZnOS phosphor are presented. The polycrystalline CaZn$_{1-x}$Mn$_x$OS ($0 \leq x \leq 0.2$) powders were prepared by a solid state reaction at high temperature. The appropriate amounts of $CaCO_3$, ZnS and $MnCO_3$ powders were weighed out and subsequently mixed and ground together. In detail the following were used for 0.015 mol phosphor:

| Comparative sample 1 | Sample 1 | Sample 2 |
|---|---|---|
| CaZnOS | CaZnOS:$Mn^{2+}$ (5%) | CaZnOS:$Mn^{2+}$ (20%) |
| 1.5013 g $CaCO_3$ | 1.5013 g $CaCO_3$ | 1.5013 g $CaCO_3$ |
| 1.4616 g ZnS | 1.3885 g ZnS | 1.1693 g ZnS |
| | 0.0862 g $MnCO_3$ | 0.3448 g $MnCO_3$ |

The powder mixtures were then transferred into molybdenum crucibles. Subsequently, those powder mixtures were fired at 1000° C. for 48 h under flowing $N_2$ atmosphere. After firing, the samples were gradually cooled down to room temperature in the furnace.

FIG. 1 shows the diffuse reflection spectra of undoped comparative and the $Mn^{2+}$-doped CaZnOS samples. Both undoped and $Mn^{2+}$-doped samples show a strong drop in reflection in the UV range below 300 nm, corresponding to the absorption of the CaZnOS host lattice. Additionally, several narrow strong absorption bands located at 396 nm, 438 nm and 490 nm can be seen from the reflection spectra of higher $Mn^{2+}$ concentration samples 1 and 2, which can be attributed to the absorption by $Mn^{2+}$ ions due to the absence of them in undoped CaZnOS (comparative sample 1). The intensities of these increase for higher $Mn^{2+}$ concentration. As a consequence of the strong absorption of the $Mn^{2+}$ ions in the visible range, around 350-550 nm, CaZnOS:$Mn^{2+}$ phosphors show white to pink color varying with the $Mn^{2+}$ concentration. In fact, the absorption behavior of CaZnOS:$Mn^{2+}$ phosphor is unusual and contrary to the expectation because weak absorption in the visible range is expected due to strictly forbidden d-d transitions of $Mn^{2+}$ ions.

FIG. 2 shows the excitation and emission spectra of CaZnOS:$Mn^{2+}$ (5%) phosphor (sample 1).

The emission spectrum of CaZnOS:$Mn^{2+}$ phosphor shows a narrow symmetric emission band in the wavelength range of 550 nm to 700 nm with a peak center at 614 nm irrespective of the excitation wavelength. The half-width for this single narrow emission band is about 50 nm.

The excitation spectrum of CaZnOS:$Mn^{2+}$ phosphor extends for a broad range of wavelengths (230 nm to 550 nm) and is consistent with the diffuse reflectance spectra in FIG. 1. Definitely, the short strong excitation bands below 350 nm originate from host lattice excitation as can be concluded from the comparison with the reflection spectrum. The appearance of the host lattice excitation bands in the excitation spectrum of $Mn^{2+}$ indicates that there exists efficient energy transfer from the host lattice of CaZnOS to $Mn^{2+}$ ions. The remaining excitation bands in the wavelength range of 350 nm to 550 nm can be assigned to the transitions of $Mn^{2+}$ ions. The shape and position of the host lattice excitation bands and $Mn^{2+}$ excitation bands are almost independent of the $Mn^{2+}$ doping concentrations except for a minor redshift in the peak center of host lattice excitation bands with increasing $Mn^{2+}$ concentration. In addition, the ratio between the intensities of the excitation bands increases with increasing $Mn^{2+}$ concentration. Finally, a typical band emission of $Mn^{2+}$ in a CaZnOS host lattice can be realized in both ways—exciting the $Mn^{2+}$ ion directly in its own excitation levels or exciting the host lattice with following efficient energy transfer from the host lattice to the $Mn^{2+}$ ion—making the phosphor suitable for UV as well as white-light emitting LED applications. It should be mentioned that as for the compounds of CaZnOS and BaZnOS, $Mn^{2+}$ shows a different luminescence property in these two compounds, which can be ascribed to the different crystal structure and different coordination environment for Mn ion in these two compounds. Especially, the high absorption and strong excitation bands of CaZnOS:Mn phosphor in the wavelength range of 350 nm to 550 nm are very favorable properties for applications as LED conversion phosphors.

An important feature of the inventive phosphor is the addition of further activators and/or sensitizers to $Mn^{2+}$-activated CaZnOS or BaZnOS phosphors. Such sensitized phosphors were prepared as described in the following: Appropriate amounts of $CaCO_3$ or $BaC_2O_4$, ZnS, MnS, $PbCO_3$, $Bi_2O_3$, $La_2O_3$ and $Li_2CO_3$ powders were weighed out and subsequently mixed and ground together. In detail the following were used for 0.25 mol phosphor:

| Sample 3 | Sample 4 | Sample 5 | Sample 6 | Comparative sample 2 |
|---|---|---|---|---|
| CaZnOS:$Mn^{2+}$ (3%) | CaZnOS:$Mn^{2+}$, $Pb^{2+}$ (3%/5%) | BaZnOS:$Mn^{2+}$, $Bi^{3+}$, $Li^+$ (1%/0.5%) | BaZnOS:$Mn^{2+}$, $La^{3+}$, $Li^+$ (1%/0.5%) | BaZnOS:$Mn^{2+}$ (1%) |
| 25.022 g $CaCO_3$ | 23.771 g $CaCO_3$ | 55.774 g $BaC_2O_4$ | 55.774 g $BaC_2O_4$ | 56.337 g $BaC_2O_4$ |
| 23.629 g ZnS | 23.629 g ZnS | 24.116 g ZnS | 24.116 g ZnS | 24.116 g ZnS |

-continued

| Sample 3 | Sample 4 | Sample 5 | Sample 6 | Comparative sample 2 |
|---|---|---|---|---|
| 0.652 g MnS | 0.652 g MnS<br>3.340 g PbCO$_3$ | 0.217 g MnS<br>0.291 g Bi$_2$O$_3$<br>0.046 g Li$_2$CO$_3$ | 0.217 g MnS<br>0.204 g La$_2$O$_3$<br>0.046 g Li$_2$CO$_3$ | 0.217 g MnS |

The powder mixtures were then transferred into alumina crucibles. Subsequently, those powder mixtures were fired at 920-1050° C. for 8 h under flowing N$_2$ atmosphere. After firing, the samples were gradually cooled down to room temperature in the furnace.

Unfortunately, MZnOS:Mn$^{2+}$ phosphors with M=Ca, Ba show a lack in excitibiliy in the range 320 nm to 430 nm. In the case of CaZnOS, this problem can be overcome by using Pb$^{2+}$ ions as a further activator that also acts as a sensitizer.

FIG. 3 shows the emission spectra of CaZnOS:Mn$^{2+}$ phosphors and CaZnOS:Mn$^{2+}$, Pb$^{2+}$ phosphors at 365 nm excitation, in comparison. CaZnOS phosphors doped with Pb$^{2+}$ ions only show a blue emission band in the wavelength range 350 nm to 550 nm with peak center at 405 nm to 425 nm, respectively, when excited by UV radiation at 330 nm to 380 nm. When the phosphor is co-doped with Mn$^{2+}$ ions, an efficient energy transfer from the excited Pb$^{2+}$ ions to the Mn$^{2+}$ ions takes place and an intensive red Mn$^{2+}$ emission can be observed.

Figure 4:
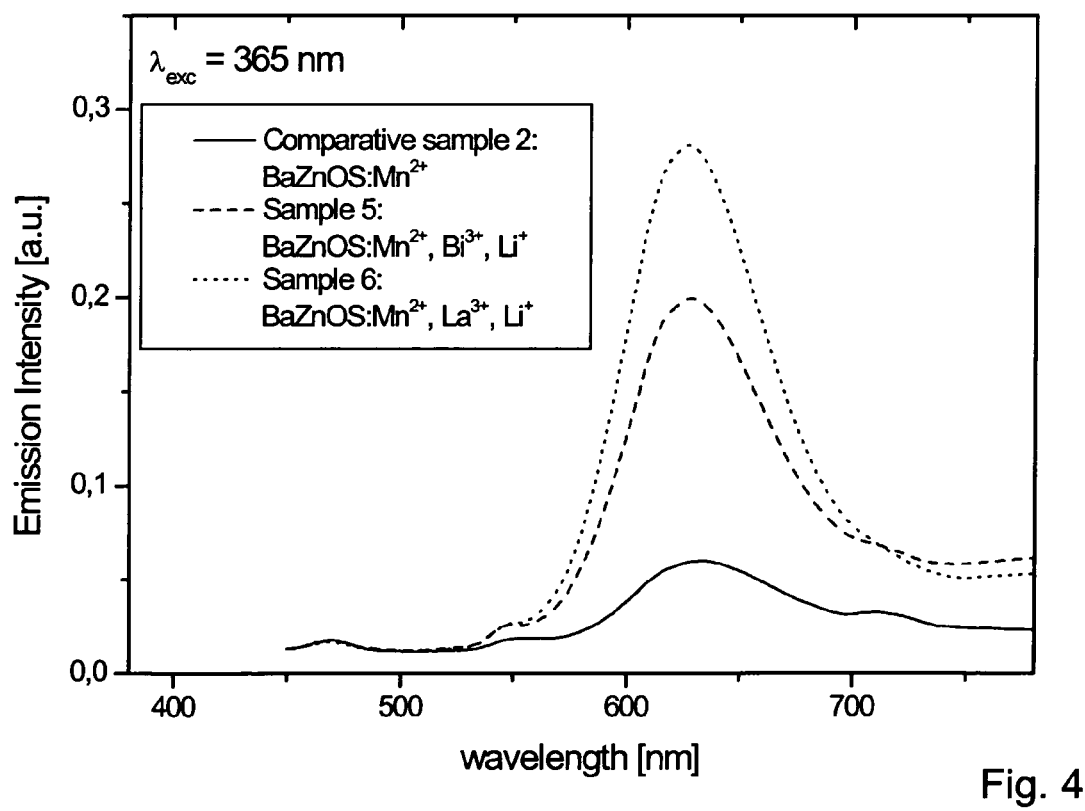

The excitability of BaZnOS:Mn$^{2+}$ phosphors in the NUV range can be especially increased by co-doping of Bi$^{3+}$, La$^{3+}$ or Pb$^{2+}$ as it is demonstrated for Bi$^{3+}$ and La$^{3+}$ in FIG. 4. For keeping the charge neutrality of the compound monovalent ions like Li$^+$, Na$^+$, K$^+$ or Rb$^+$ can be added when trivalent activators are used.

Bi$^{3+}$ and Pb$^{2+}$-activated BaZnOS phosphors show a blue emission band in the wavelength range 400 nm to 550 nm with peak center at 470 nm to 495 nm and 455 nm to 460 nm, respectively, when excited by NUV radiation at 365 nm. BaZnOS phosphors doped with Mn$^{2+}$ and Bi$^{3+}$ or La$^{3+}$ and Li$^+$ show a narrow symmetric emission band in the wavelength range of 550 nm to 700 nm with peak center at about 630 nm to 635 nm when excited in the NUV range. This emission band can be ascribed to the manganese luminescence and is the consequence of an efficient energy transfer from the excited Bi$^{3+}$ or La$^{3+}$ ions to the Mn$^{2+}$ ions.

However, the composition of the inventive phosphor is not limited to the examples described.

The invention claimed is:

1. A phosphor having the general formula:
ABOS:M, where
A is at least one element selected from the group consisting of Ca, Mg, and Sr;
B is at least one element selected from the group consisting of Zn and Mg; and
M is at least one element selected from the group consisting of Mn2+, Pb2+, Sb3+, and Bi3+; and wherein M optionally further comprises at least one element selected from the group consisting of Pb2+, Bi3+, Li+, Na+, K+, and Rb+.

2. The phosphor according to claim 1, having the general formula:
CaZnOS:M, where
Ca is partially replaced by Mg, and/or Sr; and/or
Zn is partially replaced by Mg.

3. The phosphor according to claim 2, wherein M contains at least one element selected from the group consisting of Sb$^{3+}$ and Bi$^{3+}$ and at least one element selected from the group consisting of Li$^+$, Na$^+$, K$^+$, and Rb$^+$.

4. The phosphor according to claim 2, wherein M contains Mn$^{2+}$ and additionally none or at least one element selected from the group consisting of Pb$^{2+}$ and Bi$^{3+}$ as well as Li$^+$, Na$^+$, K$^+$, and Rb$^+$.

5. The phosphor according to claim 1, wherein M contains at least one element selected from the group consisting of Sb3+ and Bi3+ and at least one element selected from the group consisting of Li+, Na+, K+, and Rb+.

6. The phosphor according to claim 5, wherein M contains Mn$^{2+}$ and additionally none or at least one element selected from the group consisting of Pb$^{2+}$ and Bi$^{3+}$ as well as Li$^+$, Na$^+$, K$^+$, and Rb$^+$.

7. The phosphor according to claim 1, wherein M contains Mn2+ and optionally further consists of at least one element selected from the group consisting of Pb2+, Bi3+, Li+, Na+, K+, and Rb+.

8. The phosphor according to claim 7, wherein Mn2+ is the only first element of M and the phosphor shows one of the following general formulas:
CaZnOS:M;
CaZnOS:M, wherein the second element of M is Pb2+.

9. The phosphor according to claim 1, wherein M is adjusted in the range from zero up to 50 atomic percent.

10. The phosphor according to claim 1, wherein the phosphor shows emission bands in the visible range of 400-780 nm.

11. The phosphor according to claim 1, wherein the phosphor shows excitation bands in the range of 200-550 nm.

12. The phosphor according to claim 1, wherein the phosphor shows emission bands with a small width at half-maximum.

13. A light source comprising a light emitting element that emits a first radiation and a phosphor according to claim 1, wherein the phosphor is used as a radiation converter for the transformation of at least a part of said first radiation emitted by the light emitting element.

14. The light source according to claim 13, wherein the first radiation emitted by said light emitting element comprises cathode or X-rays, UV, violet or blue radiation, which is transformed partly or in full into a longer-wave visible light that will be emitted by the phosphor preferably in a blue to red spectral region.

15. The light source according to claim 14, wherein the light emitting element is an electron or X-ray generator, a high or low-pressure discharge plasma, a UV or blue emitting organic or inorganic light emitting diode (LED) or laser or laser diode, or in addition, an inorganic thin or thick electroluminescent screen.

16. The light source according to claim 14 further comprising at least a second phosphor that emits red, yellow, green, and/or blue light.

17. The light source according to claim 13, wherein the light emitting element is an electron or X-ray generator, a high or low-pressure discharge plasma, a UV or blue emitting organic or inorganic light emitting diode (LED) or laser or laser diode, or an inorganic thin or thick electro-luminescent screen.

18. The light source according to claim 15 further comprising at least a second phosphor that emits red, yellow, green, and/or blue light.

19. The light source according to claim 18 wherein the light source is embodied in a fluorescent lamp or white emitting LED with an improved CRI.

20. The light source according to claim 15, wherein the light source is embodied in a CRT, a laser-based display, a fluorescent lamp, a colored light or white emitting LED, a PV cell, or a greenhouse foil or glass.

* * * * *